(12) United States Patent
Kim et al.

(10) Patent No.: US 9,122,279 B2
(45) Date of Patent: Sep. 1, 2015

(54) METHOD OF COMBINING TRACKLESS VEHICLE AND DEVICE THEREOF

(71) Applicant: Electronics & Telecommunications Research Institute, Daejeon (KR)

(72) Inventors: Tae Ho Kim, Gunpo-si (KR); Dong Hyouk Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1 day.

(21) Appl. No.: 14/049,869

(22) Filed: Oct. 9, 2013

(65) Prior Publication Data

US 2014/0149026 A1     May 29, 2014

(30) Foreign Application Priority Data

Nov. 26, 2012   (KR) .................. 10-2012-0134224

(51) Int. Cl.
  *G01C 21/00*   (2006.01)
  *G05D 1/02*   (2006.01)
  *G08G 1/00*   (2006.01)
  *G07C 5/00*   (2006.01)

(52) U.S. Cl.
  CPC .............. *G05D 1/0293* (2013.01); *G08G 1/22* (2013.01); *G05D 2201/0213* (2013.01)

(58) Field of Classification Search
  None
  See application file for complete search history.

(56) References Cited

U.S. PATENT DOCUMENTS

| | | | |
|---|---|---|---|
| 6,594,579 B1 * | 7/2003 | Lowrey et al. | 701/123 |
| 6,629,034 B1 * | 9/2003 | Kozak et al. | 701/537 |
| 2002/0123832 A1 * | 9/2002 | Gotvall et al. | 701/33 |
| 2003/0014180 A1 * | 1/2003 | Myr | 701/117 |
| 2003/0050742 A1 * | 3/2003 | Sakamoto et al. | 701/1 |
| 2003/0163249 A1 * | 8/2003 | Kapolka et al. | 701/123 |
| 2007/0174004 A1 * | 7/2007 | Tenzer et al. | 701/123 |
| 2008/0252487 A1 * | 10/2008 | McClellan et al. | 340/936 |
| 2010/0073124 A1 * | 3/2010 | Mahalingaiah et al. | 340/5.1 |
| 2010/0201545 A1 * | 8/2010 | Narea et al. | 340/936 |
| 2010/0274440 A1 * | 10/2010 | Kim et al. | 701/33 |
| 2011/0112717 A1 * | 5/2011 | Resner | 701/33 |
| 2011/0130894 A1 * | 6/2011 | Kim et al. | 701/2 |
| 2012/0072051 A1 | 3/2012 | Koon et al. | |
| 2013/0073112 A1 * | 3/2013 | Phelan et al. | 701/1 |
| 2013/0096815 A1 * | 4/2013 | Mason et al. | 701/400 |
| 2013/0211660 A1 * | 8/2013 | Mitchell, Peter | 701/29.3 |

FOREIGN PATENT DOCUMENTS

KR   10-2004-0041228   5/2004
KR   10-2011-0070006   6/2011

* cited by examiner

*Primary Examiner* — Rami Khatib
*Assistant Examiner* — Navid Ziaeianmehdizadeh
(74) *Attorney, Agent, or Firm* — Kile Park Reed & Houtteman PLLC

(57) ABSTRACT

Disclosed are a method of combining a trackless vehicle and a device thereof, the method including receiving running information about automobiles from a plurality of terminals, searching for terminals each having provided running information that satisfies a predetermined standard based on a similarity in the running information, and providing combining information to the searched terminals, so that energy consumption is reduced when compared to running in the form of an independent trackless vehicle and an automobile user is able to move to a desired destination.

12 Claims, 3 Drawing Sheets

METHOD OF COMBINING TRACKLESS VEHICLE AND DEVICE THEREOF

CLAIM FOR PRIORITY

This application claims priority to Korean Patent Application No. 10-2012-0134224 filed on Nov. 26, 2012 in the Korean Intellectual Property Office (KIPO), the entire contents of which are hereby incorporated by reference.

BACKGROUND

1. Technical Field

Example embodiments of the present invention relate in general to the field of a method of combining a trackless vehicle and a device thereof, and more specifically to a method of combining a trackless vehicle, capable of forming a single trackless vehicle by combining a plurality of automobiles with one another, and a device thereof.

2. Related Art

A trackless vehicle is a vehicle that runs on a normal road other than on a track, and may represent a general automobile. An independent trackless vehicle may represent a single automobile, and a plurality of automobiles may be combined with one another to form a single trackless vehicle.

In general, an automobile may move in the form of an independent trackless vehicle, but such an independent trackless vehicle consumes a large amount of energy when compared to a trackless vehicle having a plurality of automobiles combined therewith. That is, as for the trackless vehicle having a plurality of automobiles combined therewith, the plurality of automobiles move together and thus consume a small amount of energy when compared to the independent trackless vehicle.

Meanwhile, in a case in which a plurality of automobiles run in the form of a trackless vehicle while being combined with one another to save energy, even if a driver of a certain automobile included in the trackless vehicle desires to move to a different destination (or a path), the driver needs to move to a destination set in advance, that is, a destination to which the trackless vehicle moves, and thus the driver fails to move to the desired destination.

That is, in case of running in the form of an independent trackless vehicle, a large amount of energy is consumed when compared to running in the form of a trackless vehicle having a plurality of automobiles combined, and in case of running in the form of a trackless vehicle having a plurality of automobiles combined, the needs of all drivers of the automobiles are difficult to be satisfied.

SUMMARY

Accordingly, example embodiments of the present invention are provided to substantially obviate one or more problems due to limitations and disadvantages of the related art.

Example embodiments of the present invention provide a method of combining a trackless vehicle for forming a single trackless vehicle by combining a plurality of automobiles based on destination information.

Example embodiments of the present invention also provide a device for combining a trackless vehicle for forming a single trackless vehicle by combining a plurality of automobiles based on destination information.

In some example embodiments, a method of combining a trackless vehicle includes receiving running information about automobiles from a plurality of terminals, searching for terminals each having provided running information that satisfies a predetermined standard based on a similarity in the running information, and providing combining information to the searched terminals.

The method may further include generating accounting information with respect to a plurality of automobiles combined based on the combining information, and providing the accounting information to the plurality of automobiles combined.

In the generating of the accounting information, the accounting information may be generated based on energy consumption of the plurality of automobiles.

In the generating of the accounting information, the accounting information may be generated based on a weight according to at least one of a difference between a final starting point and starting point information about the plurality of automobiles, a difference between a final destination and destination information about the plurality of automobiles, a difference between a final starting time and starting time information about the plurality of automobiles, and a difference between a final arrival time and arrival time information about the plurality of automobiles.

In the receiving of the running information, at least one of starting point information, destination information, starting time information, and arrival time information may be received as the running information.

In other example embodiments, a method of combining a trackless vehicle includes providing running information about automobiles to a server, receiving combining information generated based on a similarity in the running information, from the server, and controlling an automobile corresponding to the terminal such that the automobile corresponding to the terminal is combined with at least one automobile based on the combining information.

The method may further include receiving accounting information with respect to a plurality of automobiles combined based on the combining information, from the server.

In the providing of the running information to the server, at least one of starting point information, destination information, starting time information, and arrival time information may be provided to the server as the running information.

In the providing of the running information to the server, intermediate destination information generated based on the starting point information and the running information may be provided to the server.

In still other example embodiments, a server for combining a trackless vehicle includes a processor and a storage. The processor may be configured to receive running information about automobiles from a plurality of terminals, search for terminals each having provided running information that satisfies a predetermined standard based on a similarity in the running information, and provide combining information to the searched terminals. The storage may be configured to store at least one of the running information and the combining information.

The processor may generate accounting information with respect to a plurality of automobiles combined based on the combining information, and provide the accounting information to the plurality of automobiles combined.

The processor may generate the accounting information based on energy consumption of the plurality of automobiles.

The processor may generate the accounting information based on a weight according to at least one of a difference between a final starting point and starting point information about the plurality of automobiles, a difference between a final destination and destination information about the plurality of automobiles, a difference between a final starting time and starting time information about the plurality of automobiles, and a difference between a final arrival time and arrival time information about the plurality of automobiles.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
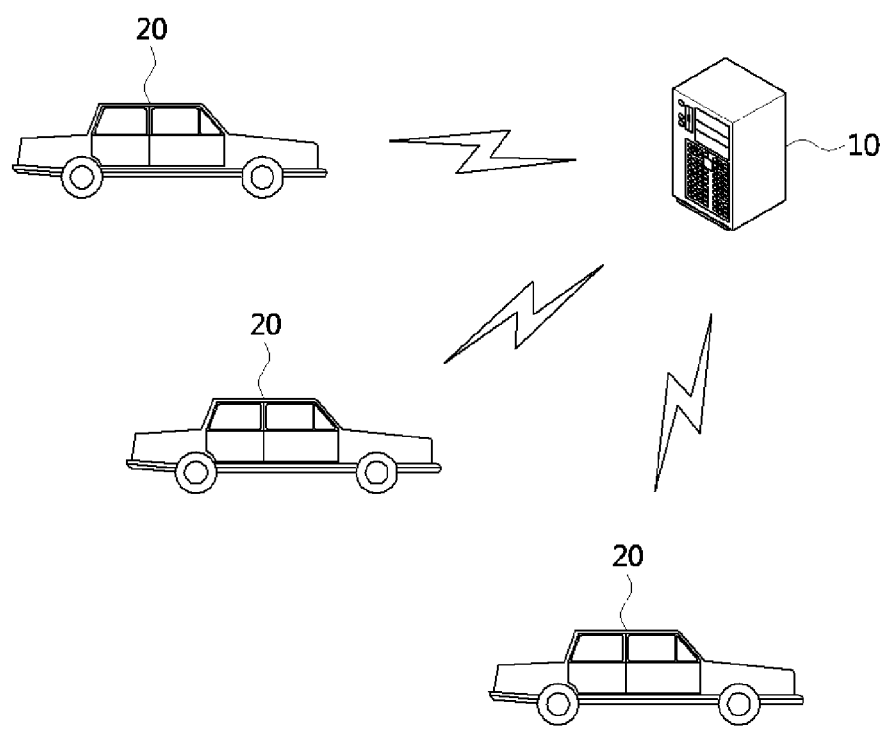
FIG. 1 is a conceptual diagram illustrating a system of combining a trackless vehicle according to an embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises", "comprising,", "includes," and/or "including", when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently, or the blocks may sometimes be executed in the reverse order, depending upon the functionality/acts involved.

Hereinafter, embodiments of the present invention will be described in detail with reference to the accompanying drawings. In describing the present invention, for convenience of description the same components are denoted by the same reference numerals, and the description thereof will be omitted in order to avoid redundancy.

In the following description, an 'independent trackless vehicle' may represent a single automobile (see FIG. 5(a), and a 'trackless vehicle' may represent a vehicle formed by combining a plurality of automobiles with one another (see FIG. 5(b)).

FIG. 1 is a conceptual diagram illustrating a system of combining a trackless vehicle according to an embodiment of the present invention.

Referring to FIG. 1, a system of combining a trackless vehicle may include a server 10 and a plurality of terminals 20. The server 10 and the plurality of terminals 20 may form a network therebetween through a wired/wireless scheme. The terminal 20 may be provided as a separate element from an automobile, or the terminal 20 itself may represent an automobile.

Herein, in a case in which the server 10 and the plurality of terminals 20 form a network through a wireless scheme, the wireless network may be implemented using a wireless Internet, such as a Wireless Fidelity (WiFi); a portable Internet such as a Wireless Broadband Internet (WiBro) or a World Interoperability for Microwave Access (WiMax); a 2G mobile communication network such as a Global System for Mobile communication (GSM) or a Code Division Multiple Access (CDMA); a 3G mobile communication network such as a Wideband Code Division Multiple Access (WCDMA) or a CDMA 2000; a 3.5G mobile communication network such as a High Speed Downlink Packet Access (HSDPA) or a High Speed Uplink Packet Access (HSUPA); and a 4G mobile communication network such as a Long Term Evolution (LTE) network or an LTE-Advanced network.

In a case in which the terminal 20 is provided as a separate element from an automobile, the terminal 20 may be implemented using a desktop computer, a laptop computer, a table PC, a wireless phone, a mobile phone, a smart phone, an e-book reader, a portable multimedia player (PMP), a portable game console, a navigation device, a digital camera, a digital multimedia broadcasting (DMB) player, a digital audio recorder, a digital audio player, a digital picture recorder, a digital picture player, a digital video recorder, and a digital video player, each of which is capable of communication.

Figure 2:
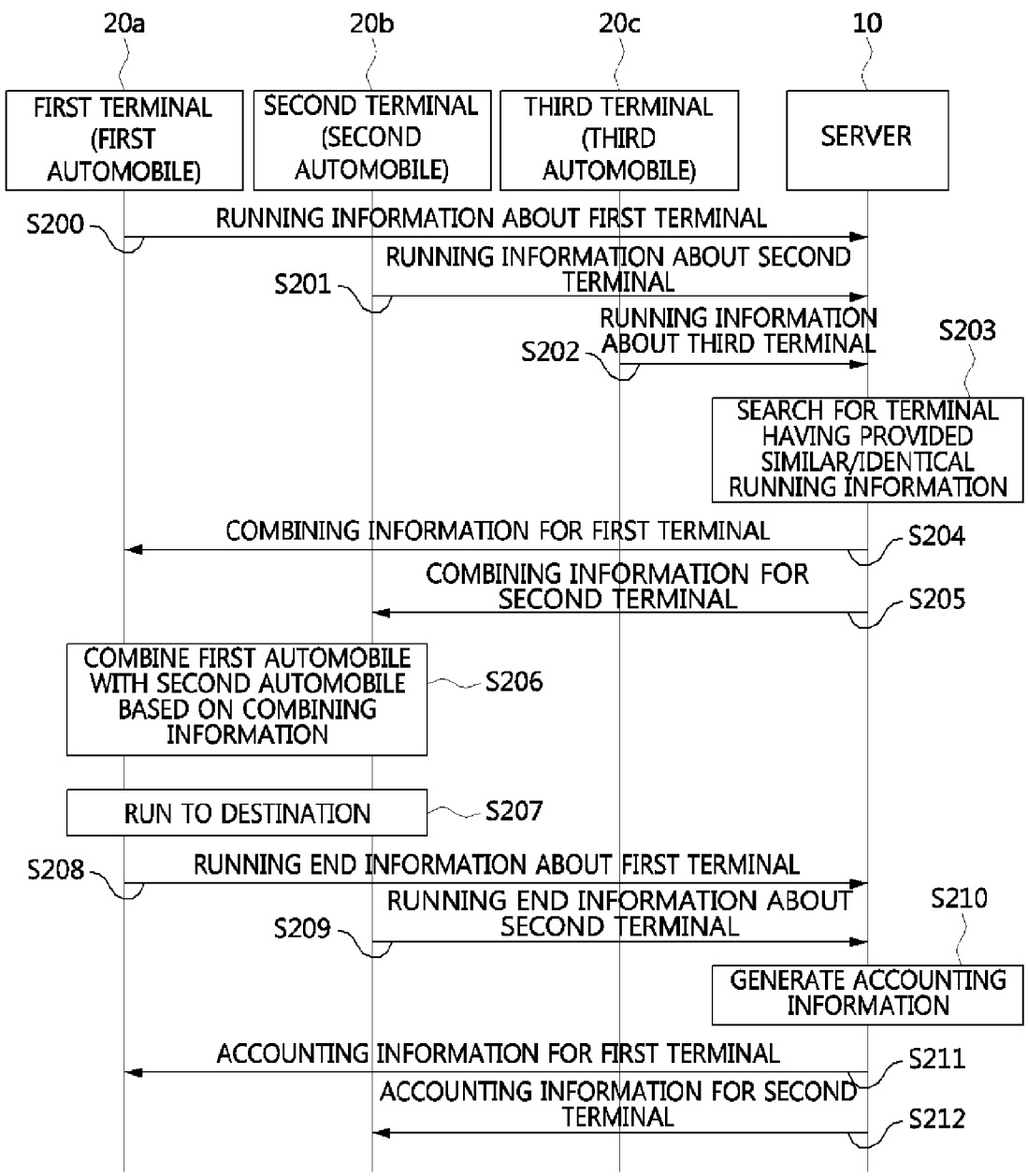
FIG. 2 is a flowchart showing a method of combining a trackless vehicle according to an embodiment of the present invention.

FIG. 2 is a flowchart showing a method of combining a trackless vehicle according to an embodiment of the present invention, in which a first terminal, a second terminal, and a third terminal may be provided as separate elements from a first automobile, a second automobile, and a third automobile, respectively, or may represent the first automobile, the second automobile, and the third automobile, respectively.

Referring to FIG. 2, the first terminal (or the first automobile) 20a may provide its own running information to a server 10 (S200), the second terminal (or the second automobile) 20b may provide its own running information to the server 10 (S201), and the third terminal (or the third automobile) 20c may provide its own running information to the server 10 (S202). Their own running information may represent running information about automobiles respectively corresponding to the terminals 20a, 20b, and 20c, and the terminals 20a, 20b, and 20c may provide running information about other terminals to the server 10 as well as their own running information. That is, the terminals 20a, 20b, and 20c may serve as a relay between the server 10 and other terminals.

The running information may include at least one of starting point information, destination information, starting time information, and arrival time information, and may further include identification information used to identify the terminals 20a, 20b, and 20c.

The starting point information may represent position information about a starting point from which automobiles corresponding to the terminals 20a, 20b, and 20c desire to start. The starting point information may be indicated using the latitude and the longitude, using addresses, or using a district name (city, town).

The destination information may represent position information about a destination at which automobiles corresponding to the terminals 20a, 20b, and 20c desire to arrive. The destination information may be indicated using the latitude and the longitude, using addresses or using a district name (city, town). In addition, the destination information may include intermediate destination information as well as information about a destination at which an automobile desires to arrive in the end.

The starting time information may represent time information at which automobiles corresponding to the terminals 20a, 20b, and 20c desire to start. The starting time information may be indicated by specifying a predetermined point of time (for example, a starting time: 9:00) or indicated as specified in a range of time (for example, a starting time: 9:00~9:40).

The arrival time information may represent time information at which automobiles corresponding to the terminals 20a, 20b, and 20c desire to arrive. The arrival time information may be indicated by specifying a predetermined point of time (for example, an arrival time: 16:00) or indicated as specified in a range of time (for example, an arrival time: 16:00~17:00).

The identification information may represent information used to identify the terminals 20a, 20b, and 20c, and automobiles corresponding to the terminals 20a, 20b, and 20c, respectively. Through the identification information, the vehicle number, the vehicle specification (for example, the displacement, fuel, fuel efficiency, power, and riding capacity), the size, and the weight of the vehicle may be checked.

The terminals 20a, 20b, and 20c may generate the intermediate destination information based on the starting point information and the destination information, and provide the generated intermediate destination information to the server 10. For example, in a case in which the starting point information is Seoul and the destination information is Busan, the terminals 20a, 20b, and 20c may generate intermediate destination information including Daejeon and Daegu, and provide the generated intermediate destination information to the server 10.

After receiving the running information about the terminals 20a, 20b, and 20c, the server 10 may search the terminals 20a, 20b, and 20c for a terminal, which has provided running information that satisfies (similar or identical) a predetermined standard based on a similarity in the running information (S203). That is, the server 10 may search the terminals 20a, 20b, and 20c for a terminal, which has provided similar or identical running information based on a similarity in terms of at least one of the starting point information, the destination information (including the intermediate destination information), the starting time information, and the arrival time information.

The similarity in the starting point information may be determined depending on a distance between respective pieces of starting point information about the terminals 20a, 20b, and 20c. For example, if a distance between the starting point information about the first terminal 20a and the starting point information about the second terminal 20b is equal to or smaller than '1 km', the similarity in the starting point information may be determined as 'identical', if a distance between the starting point information about the second terminal 20b and the starting point information about the third terminal 20c is larger than '1 km' and equal to or smaller than '3 km', the similarity in the starting point information may be determined as 'similar', and if a distance between the starting point information about the first terminal 20a and the starting point information about the third terminal 20c is larger than '3 km', the similarity in the starting point information may be determined as 'not similar'.

The similarity in the destination information may be determined depending on a distance between respective pieces of destination information about the terminals 20a, 20b, and 20c. For example, if a distance between the destination information about the first terminal 20a and the destination information about the second terminal 20b is equal to or smaller than '1 km', the similarity in the destination information may be determined as 'identical', if a distance between the destination information about the second terminal 20b and the destination information about the third terminal 20c is larger than '1 km' and equal to or smaller than '3 km', the similarity in the destination information may be determined as 'similar', and if the distance between the destination information about the first terminal 20a and the destination information about the third terminal 20c is larger than '3 km', the similarity in the destination information may be determined as 'not similar'.

The similarity in the starting time information may be determined depending on a difference between respective pieces of starting time information about the terminals 20a, 20b, and 20c. For example, if a difference between the starting time information about the first terminal 20a and the starting time information about the second terminal 20b is equal to or smaller than '30 minutes', the similarity in the starting time information may be determined as 'identical', if a difference between the starting time information about the second terminal 20b and the starting time information about the third terminal 20c is larger than '30 minutes' and equal to or smaller than 'one hour', the similarity in the starting time information may be determined as 'similar', and if a difference between the starting time information about the first terminal 20a and the starting time information about the third terminal 20c is larger than 'one hour', the similarity in the starting time information may be determined as 'not similar'.

The similarity in the arrival time information may be determined depending on a difference between respective pieces of arrival time information about the terminals 20a, 20b, and 20c. For example, if a difference between the arrival time information about the first terminal 20a and the arrival time information about the second terminal 20b is equal to or smaller than '30 minutes', the similarity in the arrival time information may be determined as 'identical', if a difference between the arrival time information about the second terminal 20b and the arrival time information about the third terminal 20c is larger than '30 minutes' and equal to or smaller than 'one hour', the similarity in the arrival time information may be determined as 'similar', and if a difference between the arrival time information about the first terminal 20a and the arrival time information about the third terminal 20c is larger than 'one hour', the similarity in the arrival time information may be determined as 'not similar'.

Here, the server 10 may search the terminals 20a, 20b, and 20c for a terminal which has at least one of starting point information corresponding to a 'similar' or 'identical' similarity, destination information corresponding to a 'similar' or 'identical' similarity, starting time information corresponding to a 'similar' or 'identical' similarity, and arrival time information corresponding to a 'similar' or 'identical' similarity.

In addition, if the similarity of the destination information at which automobiles finally desire to arrive is 'not similar', the similarity in the destination information among the terminals 20a, 20b, and 20c may be determined based on the intermediate destination information, and the terminals 20a, 20b, and 20c having intermediate destination information that corresponds to a 'similar' or 'identical' similarity may be searched.

For example, in a case in which the first terminal 20a runs from Seoul (starting point) to Busan (destination) via Daejeon (intermediate destination) and the second terminal 20b runs from Seoul (starting point) to Gwanju (destination) via Daejeon (intermediate destination), the similarity in the destination between the first terminal 20a and the second terminal 20b is 'not similar' but the similarity in the intermediate destination between the first terminal 20a and the second terminal 20b is 'similar' or 'identical', so that the server 10 searches the terminals 20a, 20b, and 20c for a terminal which has intermediate destination information corresponding to a 'similar' or 'identical' similarity.

After searching for terminals among the terminals 20a, 20b, and 20c, which have provided the similar running information, the server 10 may provide combining information to the searched terminals among the terminals 20a, 20b, and 20c (S204 and S205). For example, in a case in which the first terminal 20a and the second terminal 20b are found as terminals having the similar running information, the server 10 may provide combining information to the first terminal 20a and the second terminal 20b.

Here, the combining information may include final starting point information, final destination information, final starting time information, and final arrival time information, and may further include the vehicle number, the vehicle specification, the vehicle size, the vehicle weight, and the contact information about a vehicle driver or a terminal user.

The final starting point information may represent information about a starting point that is finally confirmed, and the final starting point information may be determined as a middle point between positions indicated by respective pieces of starting point information of the terminals 20a, 20b, and 20c. Here, the final starting point information may be indicated using the latitude and the longitude, using addresses, or using a district name (city, town).

The final destination information may represent information about a destination that is finally confirmed, and the final destination information may be determined as a middle point between positions indicated by respective pieces of destination information of the terminals 20a, 20b, and 20c. Here, the final destination information may be indicated using the latitude and the longitude, using addresses, or using a district name (city, town).

The final starting time information may represent information about a starting time that is finally confirmed, and the final starting time information may be determined as a middle value between times indicated by respective pieces of starting time information about the terminals 20a, 20b, and 20c. Here, the final starting time information may be indicated by specifying a predetermined point of time (for example, a final starting time: 9:00) or indicated as specified in a range of time (for example, a final starting time: 9:00~9:40).

The final arrival time information may represent information about an arrival time that is finally confirmed, and the final arrival time information may be determined as a middle value between times indicated by respective pieces of arrival time information about the terminals 20a, 20b, and 20c. Here, the final arrival time information may be indicated by specifying a predetermined point of time (for example, a final arrival time: 16:00) or indicated as specified in a range of time (for example, a final arrival time: 16:00~17:00)).

The combining information described above may be generated by the server 10. That is, the server 10 may confirm the final starting point information, the final destination information, the final starting time information, and the final arrival time information, based on the running information about the terminals 20a, 20b, and 20c.

After receiving the combining information from the server 10, one of the terminals 20a, 20b, and 20c, which has received the combining information, may control its own automobile such that its own automobile is combined with at least one automobile based on the combining information (S206).

For example, in a case in which the first terminal 20a and the second terminal 20b each have received the combining information, the first terminal 20a may control a combining module (30 in FIG. 5) provided at an automobile of the first terminal 20a such that the automobile of the first terminal 20a is combined with an automobile corresponding to the second terminal 20b, and the second terminal 20b may control a combining module (30 in FIG. 5) provided at an automobile of the second terminal 20b such that the automobile of the second terminal 20b is combined with the automobile corresponding to the first terminal 20a. For example, the operation of the combining module (30 in FIG. 5) may be controlled such that the combining module (30 in FIG. 5) is exposed to the outside.

Figure 5:
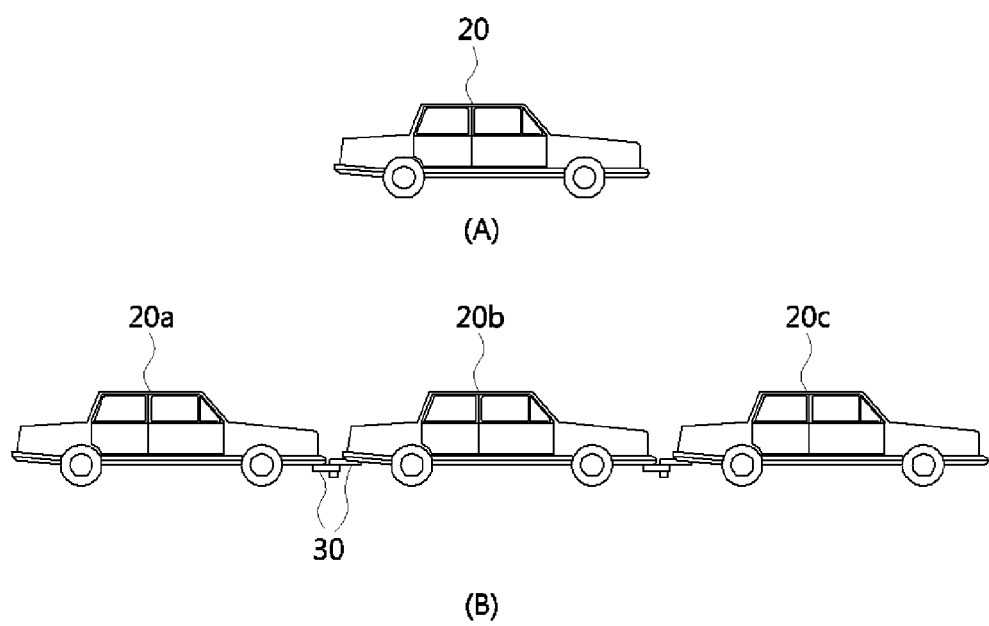
FIG. 5 is a conceptual diagram illustrating the combination relationship between trackless vehicles.

FIG. 5 is a conceptual diagram illustrating the combination relationship between trackless vehicles. FIG. 5 (a) represents an independent trackless vehicle, and FIG. 5(b) represents a trackless vehicle having a plurality of automobiles combined through operation S206. In FIG. 5 (b), the respective automobiles 20a, 20b, and 20c may be combined with one another through the combining modules 30 extending from lower portions of the automobiles 20a, 20b, and 20c, respectively.

After the trackless vehicle is formed based on the combining information, the trackless vehicles may run to a destination or a final destination (S207). For example, a trackless vehicle having a first automobile corresponding to the first terminal 20a and a second automobile corresponding to the second terminal 20b combined with each other may move to a final destination determined based on the running information about the first terminal 20a and the second terminal 20b. In this case, in order that a speed of the first automobile corresponding to the first terminal 20a becomes identical to a speed of the second automobile corresponding to the second terminal 20b, the first terminal 20a and the second terminal 20b may synchronize the speed of the first automobile with the speed of the second automobile. In addition, the power of the trackless vehicle may be supplied by a foremost automobile or may be supplied by all the automobiles combined.

In case of running to a destination, a driver may personally drive the trackless vehicle, that is, in a manual mode, or the trackless vehicle may be automatically run by a controller (for example, a computer) to the destination in an automatic mode.

After the arrival at the destination, the terminals 20a, 20b, and 20c may provide running end information to the server 10 (S208 and S209). For example, in a case in which the trackless vehicle having the first automobile corresponding to the first terminal 20a and the second automobile corresponding to the second terminal 20b combined with each other arrives at the destination, the first terminal 20a and the second terminal 20b may provide running end information to the server 10. The terminals 20a, 20b, and 20c may provide the server 10 with the running end information, which includes at least one of the running time, running distance, and energy consumption. Here, operations S208 and S209 of the terminals 20a and 20b providing the running end information to the server 10 may be omitted.

After the trackless vehicle formed of a plurality of automobiles arrives at the destination, the server 10 may generate accounting information with respect to the plurality of automobiles combined based on the combining information (S210).

The server 10 may generate the accounting information based on energy consumption of the plurality of automobiles forming the trackless vehicle. For example, the total energy consumption of the trackless vehicle having finished running from the starting point to the destination is calculated (or the energy consumption included in the running end information is used), and in a case in which the power of the trackless vehicle is supplied by the foremost automobile, the accounting information may be generated such that the foremost automobile pays less user fees when compared to other vehicles, that is, the foremost automobile is given a less weight.

Meanwhile, in a case in which all the automobiles forming the trackless vehicle supply power, the accounting information may be generated such that all the automobiles pay the same user fees, and since a heavy automobile consumes more energy, the accounting information may be generated such that the heavy automobile pays more user fees when compared to other vehicles, that is, the heavy automobile is given a more weight, and since the foremost automobile consumes more energy, the accounting information may be generated such that the foremost pays less user fees when compared to other vehicles, that is, the foremost automobile is given a less weight.

After the accounting information is generated based on the energy consumption, the server 10 may adjust or generate the accounting information based on the difference between the final starting point and the starting point information about the plurality of automobiles, the difference between the final destination and the destination information about the plurality of automobiles, the difference between the final starting time and the starting time information about the plurality of automobiles, and the difference between the final arrival time and the arrival time information about the plurality of automobiles.

For example, in a case in which the difference between the starting point information about the first automobile corresponding to the first terminal 20a and the final starting point is '2 km' and the difference between the starting point information about the second automobile corresponding to the second terminal 20b and the final starting point is '0.5 km', the server 10 may adjust the accounting information by placing a less weight on the first automobile corresponding to the first terminal 20a when compared to a weight placed on the second automobile corresponding to the second terminal 20b such that the first automobile corresponding to the first terminal 20a pays less user fees, that is, the first automobile corresponding to the first terminal 20a may be given a discount on the user fees.

In a case in which the difference between the destination information about the first automobile corresponding to the first terminal 20a and the final destination is '2 km' and the difference between the destination information about the second automobile corresponding to the second terminal 20b and the final destination is '0.5 km', the server 10 may adjust the accounting information by placing a less weight on the first automobile corresponding to the first terminal 20a when compared to a weight placed on the second automobile corresponding to the second terminal 20b such that the first automobile corresponding to the first terminal 20a pays less user fees, that is, the first automobile corresponding to the first terminal 20a may be given a discount on the user fees.

In a case in which the difference between the starting time information about the first automobile corresponding to the first terminal 20a and the final starting time is '50 minutes', and the difference between the starting time information about the second automobile corresponding to the second terminal 20b and the final starting time is '20 minutes', the server 10 may adjust the accounting information by placing a less weight on the first automobile corresponding to the first terminal 20a when compared to a weight placed on the second automobile corresponding to the second terminal 20b such that the first automobile corresponding to the first terminal 20a pays less user fees, that is, the first automobile corresponding to the first terminal 20a may be given a discount on the user fees.

In a case in which the difference between the arrival time information about the first automobile corresponding to the first terminal 20a and the final arrival time is '50 minutes', and the difference between the arrival time information of the second automobile corresponding to the second terminal 20b and the final arrival time is '20 minutes', the server 10 may adjust the accounting information by placing a less weight on the first automobile corresponding to the first terminal 20a when compared to a weight placed on the second automobile corresponding to the second terminal 20b such that the first automobile corresponding to the first terminal 20a pays less user fees, that is, the first automobile corresponding to the first terminal 20a may be given a discount on the user fees.

After the accounting information is generated, the server 10 may provide the accounting information to a plurality of terminals forming the trackless vehicle (S211 and S212). In a case in which the first terminal 20a and the second terminal 20b form the trackless vehicle, the server 10 may provide the accounting information to the first terminal 20a and the second terminal 20b.

The terminals 20a, 20b, and 20c having received the accounting information may pay the user fees according to the accounting information, and the terminals 20a, 20b, and 20c may pay the user fees on e-money provided by the server 10.

The terminals 20a, 20b, and 20c having paid the user fees according to the accounting information may control the combining modules (30 in FIG. 5 (b)) to cancel the combination of their own automobiles with other automobiles.

Figure 3:
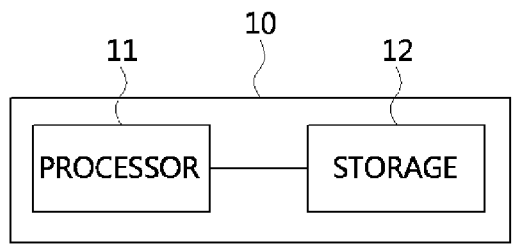
FIG. 3 is a block diagram illustrating the configuration of a server for a trackless vehicle combination according to an embodiment of the present invention.

FIG. 3 is a block diagram illustrating the configuration of a server for a trackless vehicle combination according to an embodiment of the present invention.

Referring to FIG. 3, a server 10 may include a processor 11 and a storage 12. The processor 11 may receive running information about automobiles from a plurality of terminals, search for terminals having provided running information that satisfies (similar or identical) a predetermined standard based on similarity in the running information, and provide the searched terminals with combining information. In addition, the processor 11 may provide accounting information to the terminals corresponding to a plurality of automobiles combined based on the combining information.

Here, detailed description of the configuration of the processor 11 receiving the running information about the automobiles from the plurality of terminals is identical to the details described based on operations S200, S201, and S202, detailed description of configuration of searching for the terminals having provided the running information that satisfies a predetermined standard based on the similarity in the running information is identical to the details described based on operation S203, detailed description of the configuration of providing the combining information to the searched terminals is identical to the details described based on operations S204 and S205, and detailed description of the configuration of proving the accounting information to a plurality of automobiles combined based on the combining information is identical to the details described based on operations S210, S211, and S212.

The storage 12 may store at least one of the running information, the combining information, and the accounting information.

The functions performed by the processor 11 may be substantially performed by a processor, for example, a central processing unit (CPU) and/or a graphics processing unit (GPU), and each operation illustrated in FIG. 2 may be performed by the processor.

Figure 4:
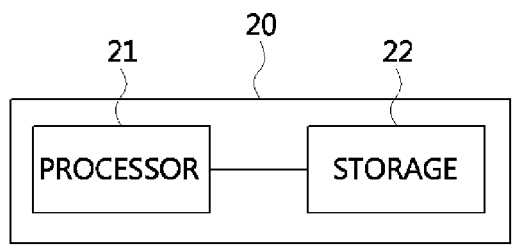
FIG. 4 is a block diagram illustrating the configuration of a terminal for a trackless vehicle combination according to an embodiment of the present invention.

FIG. 4 is a block diagram illustrating the configuration of a terminal for the trackless vehicle combination according to an embodiment of the present invention.

Referring to FIG. 4, a terminal 20 may include a processor 21 and a storage 22. The processor 21 may provide running information about an automobile to a server, receive combining information, which is generated based on similarity in the running information, from the server, and control an automobile corresponding to the processor such that a combination with respect to at least one automobile is achieved based on the combining information. In addition, the processor 21 may receive accounting information from the server.

The storage 22 may store at least one of the running information, combining information, and accounting information.

Here, detailed description of the configuration of the processor 21 providing the running information about the automobile to the server is identical to the details described based on operations S200, S201, and S202, detailed description of the configuration of receiving the combining information generated based on the similarity in the running information from the server is identical to the details described based on operations S204 and S205, detailed description of the configuration of controlling the automobile corresponding to the processor such that the combination with respect to at least one automobile is achieved based on the combining information is identical to the details described based on operation S206, and detailed description of the configuration of receiving the accounting information from the server is identical to the details described based on operations S211 and S212.

The functions performed by the processor 21 may be substantially performed by a processor, for example, a central processing unit (CPU) and/or a graphics processing unit (GPU), and each operation illustrated in FIG. 2 may be performed by the processor.

Methods in accordance with the present invention can be embodied in the form of a computer instruction, executable by various computer elements, and recorded in a computer readable medium. The computer readable medium can include a program instruction, a data file, and a data structure, or a combination thereof. The program instruction recorded in the computer readable medium can be particularly designed and constructed for the present invention, or generally known to those skilled in the computer software and implemented. Examples of the computer readable medium include hardware devices configured to store and execute computer instruction, such as a read-only memory (ROM), a random-access memory (RAM), and a flash memory. Examples of the program instructions include a machine code, made by a compiler, and a high-level language code, executable on a computer using an interpreter. The above described hardware device can be constructed to operate in at least one software module to perform the operation of the present invention, and the converse may also be possible.

As is apparent from the above description, a single trackless vehicle is formed by combining a plurality of automobiles that move to the same destination, so the energy consumption is reduced when compared to running in the form of an independent trackless vehicle. Also, a driver of the automobile moves to a desired destination, and thus the satisfaction of the automobile driver is improved when compared to running in the form of a conventional trackless vehicle.

While the example embodiments of the present invention and their advantages have been described in detail, it should be understood that various changes, substitutions and alterations may be made herein without departing from the scope of the invention.

What is claimed is:

1. A method of combining a trackless vehicle performed at a server, the method comprising:
   receiving, by a processor, running information about an automobile from each of a plurality of terminals;
   searching, by the processor, for terminals each having provided running information that satisfies a predetermined standard based on a similarity determined by a difference between the running information received from the plurality of terminals;
   generating, by the processor, combining information based on the similarity in the running information;
   storing, in a storage unit, at least one of the combining information and the running information; and
   providing, by the processor, the combining information to the searched terminals providing the running information that satisfies the predetermined standard to control automobiles corresponding to the searched terminals such that at least two automobiles corresponding to the searched terminals are combined based on the combining information.

2. The method of claim 1, further comprising:
generating accounting information with respect to a plurality of automobiles combined based on the combining information; and
providing the accounting information to the plurality of automobiles combined.

3. The method of claim 2, wherein in the generating of the accounting information, the accounting information is generated based on energy consumption of the plurality of automobiles.

4. The method of claim 2, wherein in the generating of the accounting information, the accounting information is generated based on a weight according to at least one of a difference between a final starting point and starting point information about the plurality of automobiles, a difference between a final destination and destination information about the plurality of automobiles, a difference between a final starting time and starting time information about the plurality of automobiles, and a difference between a final arrival time and arrival time information about the plurality of automobiles.

5. The method of claim 1, wherein in the receiving of the running information, at least one of starting point information, destination information, starting time information, and arrival time information is received as the running information.

6. A method of combining a trackless vehicle performed at a terminal, the method comprising:
providing, by a processor, running information about an automobile to a server;
receiving, by a processor, from the server, combining information generated based on a similarity determined by a difference between running information provided by a plurality of terminals; and
controlling, by the processor, the automobile corresponding to the terminal such that the automobile is combined with at least one other automobile based on the combining information.

7. The method of claim 6, further comprising:
receiving accounting information with respect to a plurality of automobiles combined based on the combining information, from the server.

8. The method of claim 6, wherein in the providing of the running information to the server, at least one of starting point information, destination information, starting time information, and arrival time information is provided to the server as the running information.

9. The method of claim 8, wherein in the providing of the running information to the server, intermediate destination information generated based on the starting point information and the running information is provided to the server.

10. A server for combining a trackless vehicle, the server comprising: a processor configured to receive running information about automobiles from a plurality of terminals, search for terminals each having provided running information that satisfies a predetermined standard based on a similarity determined by a difference between the running information received from the plurality of terminals, and provide combining information to the searched terminals that provided the running information that satisfies the predetermined standard; and a storage configured to store at least one of the running information and the combining information, wherein the processor generates accounting information with respect to a plurality of automobiles combined based on the combining information, and provides the accounting information to the plurality of automobiles combined.

11. The server of claim 10, wherein the processor generates the accounting information based on energy consumption of the plurality of automobiles.

12. The server of claim 10, wherein the processor generates the accounting information based on a weight according to at least one of a difference between a final starting point and starting point information about the plurality of automobiles, a difference between a final destination and destination information about the plurality of automobiles, a difference between a final starting time and starting time information about the plurality of automobiles, and a difference between a final arrival time and arrival time information about the plurality of automobiles.

* * * * *